(12) United States Patent
Xie et al.

(10) Patent No.: US 11,286,901 B2
(45) Date of Patent: Mar. 29, 2022

(54) FLOATING PLATE TYPE MARINE REFRIGERATED CONTAINER SYSTEM CAPABLE OF GENERATING ELECTRICITY BY USING WAVE ENERGY

(71) Applicant: Shanghai Ocean University, Shanghai (CN)

(72) Inventors: Jing Xie, Shanghai (CN); Yuyao Sun, Shanghai (CN); Jinfeng Wang, Shanghai (CN)

(73) Assignee: Shanghai Ocean University, Shanghai (CN)

( * ) Notice: Subject to any disclaimer, the term of this patent is extended or adjusted under 35 U.S.C. 154(b) by 0 days.

(21) Appl. No.: 17/246,635

(22) Filed: May 1, 2021

(65) Prior Publication Data
US 2021/0254595 A1    Aug. 19, 2021

(51) Int. Cl.
| | | |
|---|---|---|
| *F03B 13/18* | (2006.01) | |
| *F03B 13/10* | (2006.01) | |
| *F25D 11/00* | (2006.01) | |
| *F25D 29/00* | (2006.01) | |

(52) U.S. Cl.
CPC ............ *F03B 13/187* (2013.01); *F03B 13/10* (2013.01); *F25D 11/003* (2013.01); *F25D 29/003* (2013.01)

(58) Field of Classification Search
CPC .......... F03B 13/187; F03B 13/10; F03B 1/00; F03B 13/20; F03B 11/00; F25D 11/003; F25D 29/003; F25D 11/006; F25D 17/06; F25B 27/00; Y02E 10/20; Y02E 10/30; B65D 88/74
USPC ........................................ 290/42, 43, 53, 54
See application file for complete search history.

(56) References Cited

U.S. PATENT DOCUMENTS

2019/0316561 A1    10/2019    Nematollahi Saein

FOREIGN PATENT DOCUMENTS

| CN | 203865315 U | 10/2014 |
| CN | 104806428 A | 7/2015 |
| CN | 105386928 A | 3/2016 |
| CN | 210554433 U | 5/2020 |

*Primary Examiner* — Charles Reid, Jr.

(57) ABSTRACT

A floating plate type marine refrigerated container system capable of generating electricity by using wave energy that relates to ocean energy, including a machine room, retractable pipes, vertical rise-fall pipes, vertical connecting rods, floating plates, controllers, a rising-falling control button, an indicator light, push-pull handles, grooves, fixed supports, generator sets, wires, a storage battery, a connecting block, a machine room door, a heat dissipation window, sliding areas, a movable plate, a displacement sensor, hinges, sliding shafts, sliding groove groups and the electrical equipment of the refrigerated container. The wave energy in the vertically moving waves is collected by the floating plate, and converted into electric energy. The electric energy are gathered to the storage battery, and finally supplied to the electrical equipment of the refrigerated container.

10 Claims, 9 Drawing Sheets

FLOATING PLATE TYPE MARINE REFRIGERATED CONTAINER SYSTEM CAPABLE OF GENERATING ELECTRICITY BY USING WAVE ENERGY

CROSS-REFERENCE TO RELATED APPLICATIONS

This application claims the benefit of priority from Chinese Patent Application No. 202010916337.2, filed on Sep. 3, 2020. The content of the aforementioned application, including any intervening amendments thereto, is incorporated herein by reference in its entirety.

TECHNICAL FIELD

This application relates to ocean energy, and more particularly to a floating plate type marine refrigerated container system capable of generating electricity by using wave energy.

BACKGROUND

Refrigerated containers are widely used in cold chain transportation, and can be used for both sea and land transportation. For refrigerated containers mechanically refrigerated by refrigeration units, a power supply or a power generation system is generally arranged in the box to supply electrical energy to the refrigeration units in the refrigerated container, but each has its own shortcomings. The energy of the built-in power supply is limited, which generally needs to be calculated in advance. In case of emergencies, the transportation route or transportation time will be lengthened, and the energy shortage will be encountered, affecting the refrigeration of the refrigerated container. The power generation system will occupy more space, which will reduce the storage space of goods, thereby reducing the transportation efficiency of refrigerated containers.

Currently, the solar energy is generally used to supply power. Specifically, solar panels are arranged on the refrigerated containers, and then absorb solar energy and convert it into electrical energy through related equipment to power the electrical equipment of the refrigerated containers. The Chinese Utility Model Patent No. 210554433U, titled "a dual-chamber dual-temperature refrigerated container with adjustable internal space" and the Chinese Utility Model Patent No. 2038653150 of "a refrigerated container powered by solar energy" both disclosed the use of solar energy to power a refrigerated container. The solar panels arranged on the top of the refrigerated container absorb solar energy and convert it into electrical energy to power the electrical equipment of the refrigerated container. However, there is a drawback in these refrigerated containers. The stacking form of refrigerated containers during land transportation is different from that of refrigerated containers during sea transportation. During the land transportation, the refrigerated containers are generally stacked in the horizontal direction, or each refrigerated container is arranged in a refrigerated truck with a suitable size, which does not affect the use of solar panels. As for the sea transportation, the refrigerated containers are generally stacked in the vertical direction, so that the solar panels of the refrigerated containers placed on the lower level cannot absorb solar energy, and the solar panels arranged on the top may be crushed by the upper refrigerated container. If the solar panel is arranged on the side of the refrigerated container, the solar energy absorption performance will be poor, so that this design is not suitable for the sea transportation.

Solar energy is a kind of renewable energy, but it cannot meet the power supply requirements of all refrigerated containers during the sea transportation. Wave energy with huge energy generally exists around the freighters. Wave energy is a kind of ocean energy, which is also a renewable energy. Wave energy is also a mechanical energy in the form of waves. Currently, wave energy is seldom used to generate electricity on the freighters, and has not been promoted.

SUMMARY

An object of this application is to provide a floating plate type marine refrigerated container system capable of generating electricity by using wave energy, which can collect the wave energy contained in the vertically-moving waves by a floating plate type wave energy collection device, and convert the collected wave energy into electric energy through the power generation equipment. The electric energy are accumulated to the storage battery, and finally transmitted to power the electrical equipment of the refrigerated container. This application can make full use of the wave energy in the vertical direction around the freighter.

The technical solutions of this application are described as follows.

This application provides a floating plate type marine refrigerated container system capable of generating electricity by using wave energy, comprising:
a machine room;
retractable pipes;
vertical rise-fall pipes;
vertical connecting rods;
floating plates;
controllers;
a rising-falling control button;
an indicator light;
push-pull handles;
grooves;
fixed supports;
generator sets;
wires;
a storage battery;
a connecting block;
a machine room door;
a heat dissipation window;
sliding areas;
a movable plate;
a displacement sensor;
hinges;
sliding shafts;
sliding groove groups; and
an lectrical equipment of a refrigerated container;
wherein the retractable pipes comprise a first retractable pipe and a second retractable pipe;
the vertical rise-fall pipes comprise a first vertical rise-fall pipe, a second vertical rise-fall pipe, a third vertical rise-fall pipe, a fourth vertical rise-fall pipe, a fifth vertical rise-fall pipe, a sixth vertical rise-fall pipe, a seventh vertical rise-fall pipe, an eighth vertical rise-fall pipe, a ninth vertical rise-fall pipe, a tenth vertical rise-fall pipe, an eleventh vertical rise-fall pipe and a twelfth vertical rise-fall pipe;
the vertical connecting rods comprise a first vertical connecting rod and a second vertical connecting rod;
the floating plates comprise a first floating plate, a second floating plate and a third floating plate;

the controllers comprise a first controller and a second controller; the push-pull handles comprise a first push-pull handle, a second push-pull handle and a third push-pull handle;

the grooves comprise a first groove and a second groove;

the fixed supports comprise a first fixed support, a second fixed support, a third fixed support, a fourth fixed support, a fifth fixed support and a sixth fixed support;

the generator sets comprise a first generator set and a second generator set;

the wires comprise a first wire and a second wire;

the sliding areas comprise a first sliding area and a second sliding area;

the hinges comprise a first hinge and a second hinge;

the sliding shafts comprise a first sliding shaft and a second sliding shaft;

the sliding groove groups comprise a first sliding groove group and a second sliding groove group;

the electrical equipment of the refrigerated container comprises a first electrical equipment of the refrigerated container, a second electrical equipment of the refrigerated container, a third electrical equipment of the refrigerated container, a fourth electrical equipment of the refrigerated container and a fifth electrical equipment of the refrigerated container;

the first vertical rise-fall pipe, the second vertical rise-fall pipe, the third vertical rise-fall pipe, the fourth vertical rise-fall pipe, the fifth vertical rise-fall pipe and the sixth vertical rise-fall pipe constitute a first vertical rise-fall pipe group;

the seventh vertical rise-fall pipe, the eighth vertical rise-fall pipe, the ninth vertical rise-fall pipe, the tenth vertical rise-fall g pipe, the eleventh vertical rise-fall pipe and the twelfth vertical rise-fall pipe constitute a second vertical rise-fall pipe group;

the first retractable pipe and the second retractable pipe are connected to a top of a right side of the machine room;

the first vertical rise-fall pipe group is connected to an end of the first retractable pipe;

the second vertical rise-fall pipe group is connected to an end of the second retractable pipe;

the first controller is arranged on an outermost side of the first vertical rise-fall pipe group and is configured to control rising and falling of the first vertical rise-fall pipe group;

the second controller is arranged on an outermost side of the second vertical rise-fall pipe group and is configured to control rising and falling of the second vertical rise-fall pipe group;

the first generator set is arranged on an upper part of an inner side of the sixth vertical rise-fall pipe;

the second generator set is arranged on an upper part of an inner side of the twelfth vertical rise-fall pipe;

the first vertical connecting rod extends from the first generator set, and is connected to the first floating plate;

the second vertical connecting rod extends from the second generator set, and is connected to the second floating plate;

the rising-falling control button and the indicator light are arranged on one side of the machine room;

the rising-falling control button is connected to the controller for remote control;

the first push-pull handle and the second push-pull handle are arranged on the first retractable pipe and the second retractable pipe, respectively;

the first groove and the second groove are respectively arranged on two surfaces of the machine room parallel to a radial direction of the first retractable pipe and the second retractable pipe, respectively;

the first push-pull handle and the second push-pull handle pass through the first groove and the second groove, respectively;

the first fixed support, the second fixed support, the third fixed support, the fourth fixed support, the fifth fixed support and the sixth fixed support are averagely arranged on three surfaces of the machine room without retractable pipes; the first fixed support and the second fixed support constitute a first fixed support group; the third fixed support and the fourth fixed support constitute a second fixed support group; the fifth fixed support and the sixth fixed support constitute a third fixed support group;

the storage battery is arranged in a corner of the machine room;

the storage battery is connected to the first generator set and the second generator set through the first wire and the second wire, respectively;

the first retractable pipe and the second retractable pipe are connected via the connecting block;

the third push-pull handle is arranged under the connecting block;

the machine room door is arranged on a surface of the machine room where the second fixed support group is arranged;

the heat dissipation window is arranged on an upper part of the machine room door;

the first sliding area is located at a center of the first floating plate;

the first sliding groove group is arranged on both sides of the first sliding area;

a lower end of the first vertical connecting rod penetrates through the first sliding shaft and is embedded in the first sliding groove group;

the second sliding area is located at a center of the second floating plate;

the second sliding groove group is arranged on both sides of the second sliding area;

a lower end of the second vertical connecting rod penetrates through the second sliding shaft and is embedded in the second sliding groove group;

the movable plate is embedded in a center of the third floating plate, and is capable of moving freely;

the displacement sensor is arranged beside the movable plate;

the indicator light is remotely connected to the displacement sensor;

the first floating plate and the third floating plate are connected via the first hinge, and the first hinge is arranged above a connection point between the first floating plate and the third floating plate;

the second floating plate and the third floating plate are connected via the second hinge, and the second hinge is arranged above a connection point between the second floating plate and the third floating plate; and the storage battery is connected to the first electrical equipment of the refrigerated container, the second electrical equipment of the refrigerated container, the third electrical equipment of the refrigerated container, the fourth electrical equipment of the refrigerated container and the fifth electrical equipment of the refrigerated container.

In some embodiments, the machine room, the retractable pipes, the vertical rise-fall pipes, the vertical connecting rods, the floating plates, the push-pull handles, the fixed supports, the connecting block, the machine room door, the movable plate, the hinges and the sliding shafts are made of aluminum alloy; outer sides of the controllers and the displacement sensor are waterproofed; and sun protection treatment is performed on an outer side of the machine room.

In some embodiments, the rising-falling control button is configured to simultaneously issue instructions to the first controller and the second controller, and the first controller and the second controller control the first vertical rise-fall pipe group and second vertical rise-fall pipe group, respectively; and sliding rails embedded between adjacent vertical rise-fall pipes are connected.

In some embodiments, the storage battery is arranged in the machine room near a wall to leave a space for an operator to stand under the third push-pull handle to operate the third push-pull handle.

In some embodiments, a plastic protective layer is provided at outer sides of the first wire and the second wire.

In some embodiments, a part of the vertical connecting rod contacting the sliding area has a circular arc surface.

In some embodiments, both ends of the sliding area adopt a circular arc surface, respectively, and the circular arc surface of the sliding area fits the circular arc surface of the part of the vertical connecting rod contacting the sliding area in radius.

In some embodiments, the movable plate is embedded in the third floating plate and is capable of moving vertically; and an initial position of the movable plate is 20-30 mm lower than the third floating plate.

In some embodiments, the displacement sensor is embedded in the third floating plate and is located beside the movable plate.

In some embodiments, the storage battery is capable of powering 3-7 refrigerated containers.

Compared to the prior art, this application has the following beneficial effects.

In the floating plate type marine refrigerated container system capable of generating electricity by using wave energy, a floating plate type wave energy collection equipment is provided to collect the wave energy contained in the vertically moving waves, and then the collected wave energy is converted into electric energy through the power generation equipment. The electric energy are accumulated to the storage battery, and finally transmitted to power the electrical equipment of the refrigerated container. This application can adjust the height of the equipment to adapt to the freighters with different sizes, and is thus suitable for various types of freighters. The disclosure provides a new idea for the renewable energy utilization of the marine refrigerated container.

Figure 1:
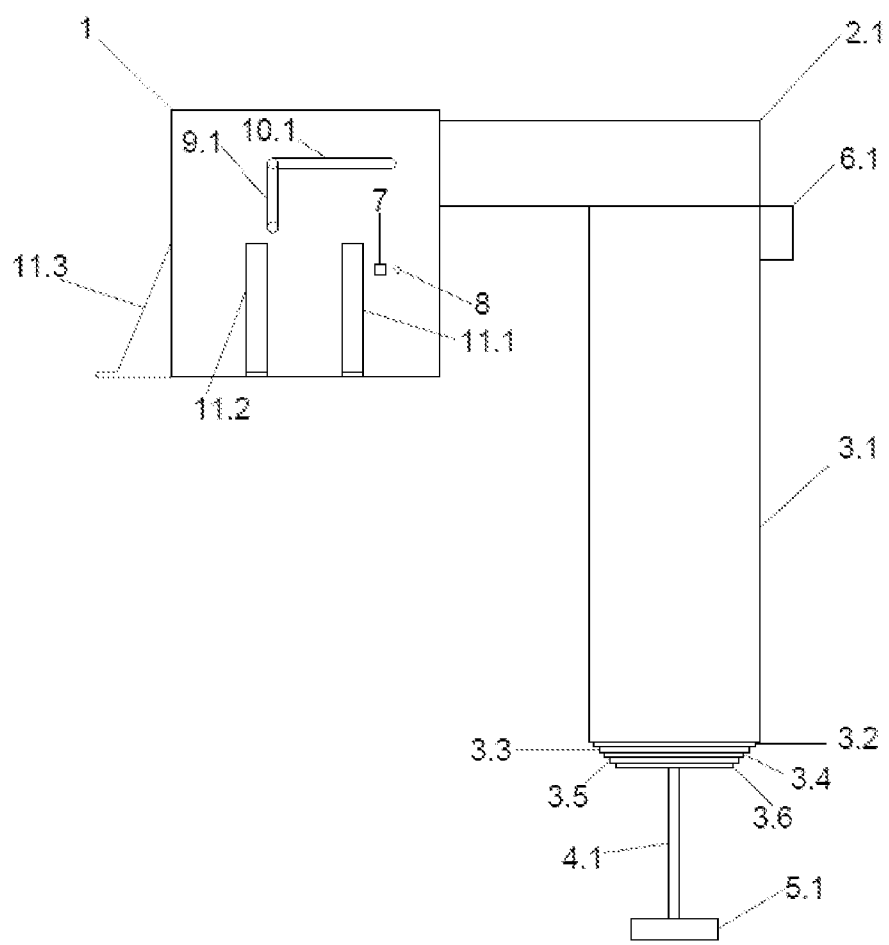
FIG. 1 is a front view of a floating plate type marine refrigerated container system capable of generating electricity by using wave energy according to an embodiment of the disclosure.

In the drawings, 1, machine room; 2.1, first retractable pipe; 2.2, second retractable pipe; 3.1, first vertical rise-fall pipe; 3.2, second vertical rise-fall pipe; 3.3, third vertical rise-fall pipe; 3.4, fourth vertical rise-fall pipe; 3.5, fifth vertical rise-fall pipe; 3.6, sixth vertical rise-fall pipe; 3.7, seventh vertical rise-fall pipe; 3.8, eighth vertical rise-fall pipe; 3.9, ninth vertical rise-fall pipe; 3.10, tenth vertical rise-fall pipe; 3.11, eleventh vertical rise-fall pipe; 3.12, twelfth vertical rise-fall pipe; 4.1, first vertical connecting rod; 4.2, second vertical connecting rod; 5.1, first floating plate; 5.2, second floating plate; 5.3, third floating plate; 6.1, first controller; 6.2, second controller; 7, rise-falling control button; 8, indicator light; 9.1, first push-pull handle; 9.2, second push-pull handle; 9.3, third push-pull handle; 10.1, first groove; 10.2, second groove; 11.1, first fixed support; 11.2, second fixed support; 11.3, third fixed support; 11.4, fourth fixed support; 11.5, fifth fixed support; 11.6, sixth fixed support; 12.1, first generator set; 12.2, second generator set; 13.1, first wire; 13.2, second wire; 14, storage battery; 15, connecting block; 16, machine room door; 17, heat dissipation window; 18.1, first sliding area; 18.2, second sliding area; 19, movable plate; 20, displacement sensor; 21.1, first hinge; 21.2, second hinge; 22.1, first sliding shaft; 22.2, second sliding shaft; 23.1, first sliding groove group; 23.2, second sliding groove group; 24.1, first electrical equipment of the refrigerated container; 24.2, second electrical equipment of the refrigerated container; 24.3, third electrical equipment of the refrigerated container; 24.4, fourth electrical equipment of the refrigerated container; and 24.5, fifth electrical equipment of the refrigerated container.

DETAILED DESCRIPTION OF EMBODIMENTS

The disclosure will be further described below in detail with reference to the accompanying drawings and the embodiments.

FIG. 1 is a front view of a floating plate type marine refrigerated container system capable of generating electricity by using wave energy of the disclosure, in which a machine room 1, a first retractable pipe 2.1, a first vertical rise-fall pipe 3.1, a second vertical rise-fall pipe 3.2, a third vertical rise-fall pipe 3.3, a fourth vertical rise-fall pipe 3.4, a fifth vertical rise-fall pipe 3.5, a sixth vertical rise-fall pipe 3.6, a first vertical connecting rod 4.1, a first floating plate 5.1, a first controller 6.1, a rising-falling control button 7, an indicator light 8, a first push-pull handle 9.1, a first groove 10.1, a first fixed support 11.1, a second fixed support 11.2 and a third fixed support 11.3 are presented.

Figure 2:
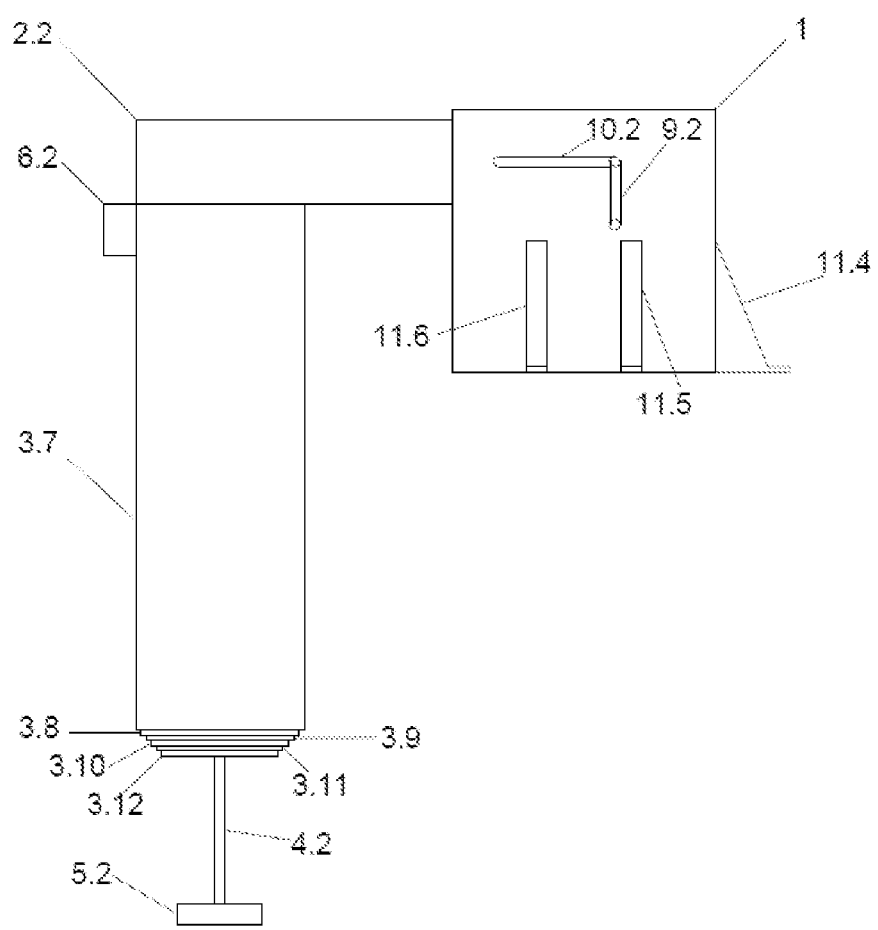
FIG. 2 is a rear view of the floating plate type marine refrigerated container system capable of generating electricity by using wave energy according to an embodiment of the disclosure.

FIG. 2 is a rear view of a floating plate type marine refrigerated container system capable of generating electricity by using wave energy of the disclosure, in which a machine room 1, a second retractable pipe 2.2, a seventh vertical rise-fall pipe 3.7, an eighth vertical rise-fall pipe 3.8, a ninth rise-fall pipe 3.9, a tenth vertical rise-fall pipe 3.10, an eleventh vertical rise-fall pipe 3.11, a twelfth vertical rise-fall pipe 3.12, a second vertical connecting rod 4.2, a second floating plate 5.2, a second controller 6.2, a rising-falling control button 7, an indicator light 8, a second push-pull handle 9.2, a second groove 10.2, a fourth fixed support 11.4, a fifth fixed support 11.5 and a sixth fixed support 11.6 are presented.

Figure 3:
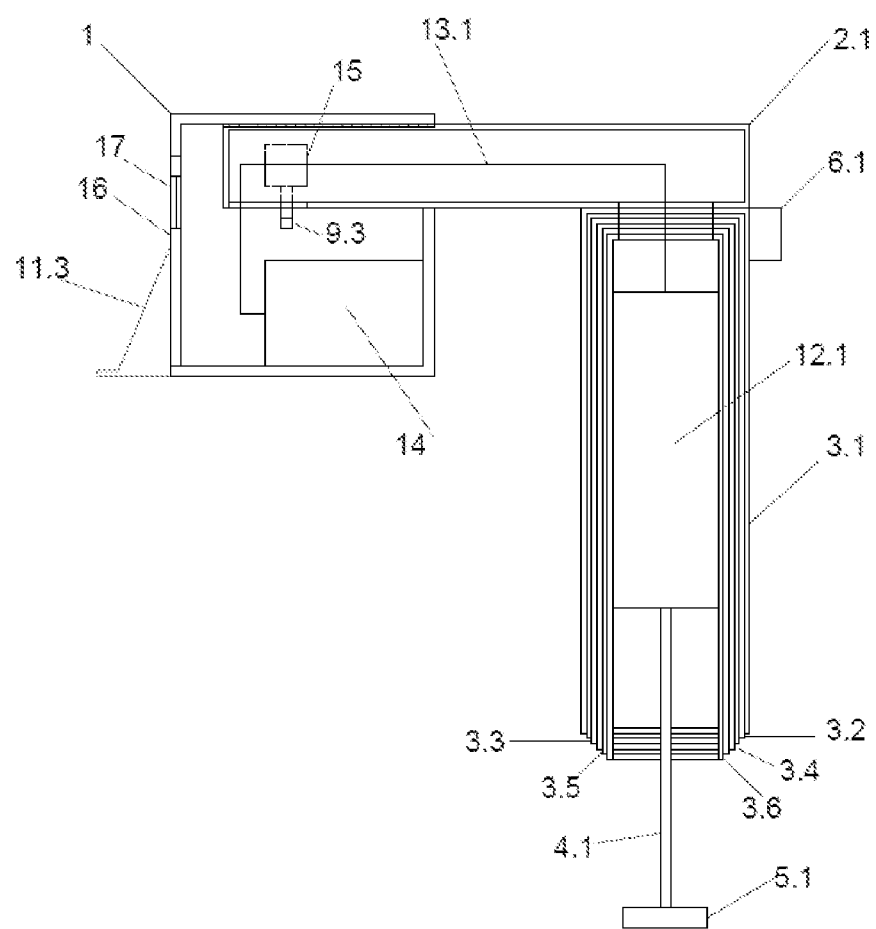
FIG. 3 is a front sectional view of the floating plate type marine refrigerated container system capable of generating electricity by using wave energy according to an embodiment of the disclosure.

FIG. 3 is a front sectional view of a floating plate type marine refrigerated container system capable of generating electricity by using wave energy of the disclosure, in which a machine room 1, a first retractable pipe 2.1, a first vertical rise-fall pipe 3.1, a second vertical rise-fall pipe 3.2, a third vertical rise-fall pipe 3.3, a fourth vertical rise-fall pipe 3.4, a fifth vertical rise-fall pipe 3.5, a sixth vertical rise-fall pipe 3.6, a first vertical connecting rod 4.1, a first floating plate 5.1, a first controller 6.1, a third push-pull handle 9.3, a third fixed support 11.3, a first generator set 12.1, a first wire 13.1, a storage battery 14, a connecting block 15, a machine room door 16 and a heat dissipation window 17 are presented.

Figure 4:
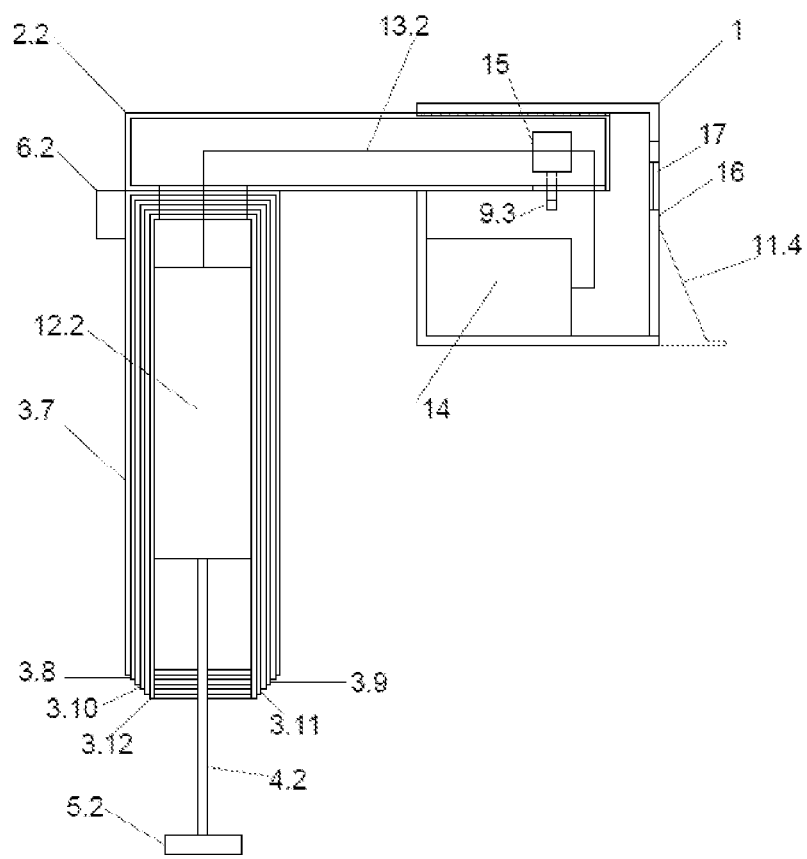
FIG. 4 is a rear sectional view of the floating plate type marine refrigerated container system capable of generating electricity by using wave energy according to an embodiment of the disclosure.

FIG. 4 is a rear sectional view of a floating plate type marine refrigerated container system capable of generating electricity by using wave energy of the disclosure, in which a machine room 1, a second retractable pipe 2.2, a seventh vertical rise-fall pipe 3.7, a eighth vertical rise-fall pipe 3.8, a ninth vertical rise-fall pipe 3.9, a tenth vertical rise-fall pipe 3.10, a eleventh vertical rise-fall pipe 3.11, a twelfth vertical rise-fall pipe 3.12, a second vertical connecting rod 4.2, a second floating plate 5.2, a second controller 6.2, a third push-pull handle 9.3, a fourth fixed support 11.4, a second generator set 12.2, a second wire 13.2, a storage battery 14, a connecting block 15, a machine room door 16 and a heat dissipation window 17 are presented.

Figure 5:
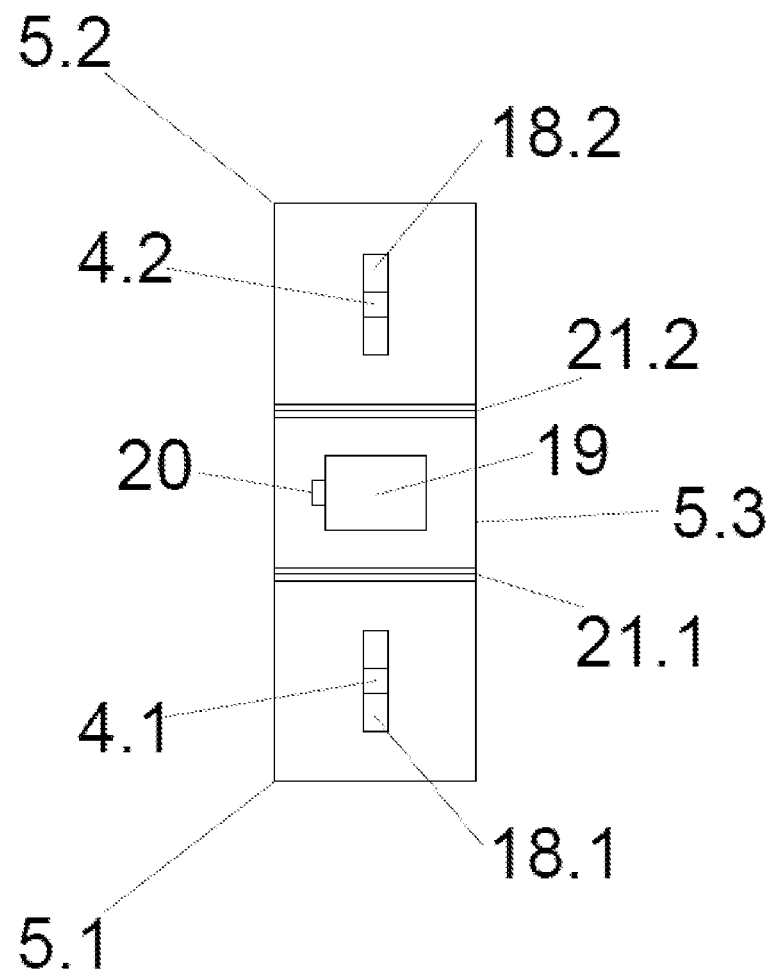
FIG. 5 is a top view of a floating plate according to an embodiment of the disclosure.

FIG. 5 is a top view of a floating plate of the disclosure, in which a first vertical connecting rod 4.1, a second vertical connecting rod 4.2, a first floating plate 5.1, a second floating plate 5.2, a third floating plate 5.3, a first sliding area 18.1, a second sliding area 18.2, a movable plate 19, a displacement sensor 20, a first hinge 21.1 and a second hinge 21.2 are presented.

Figure 6:
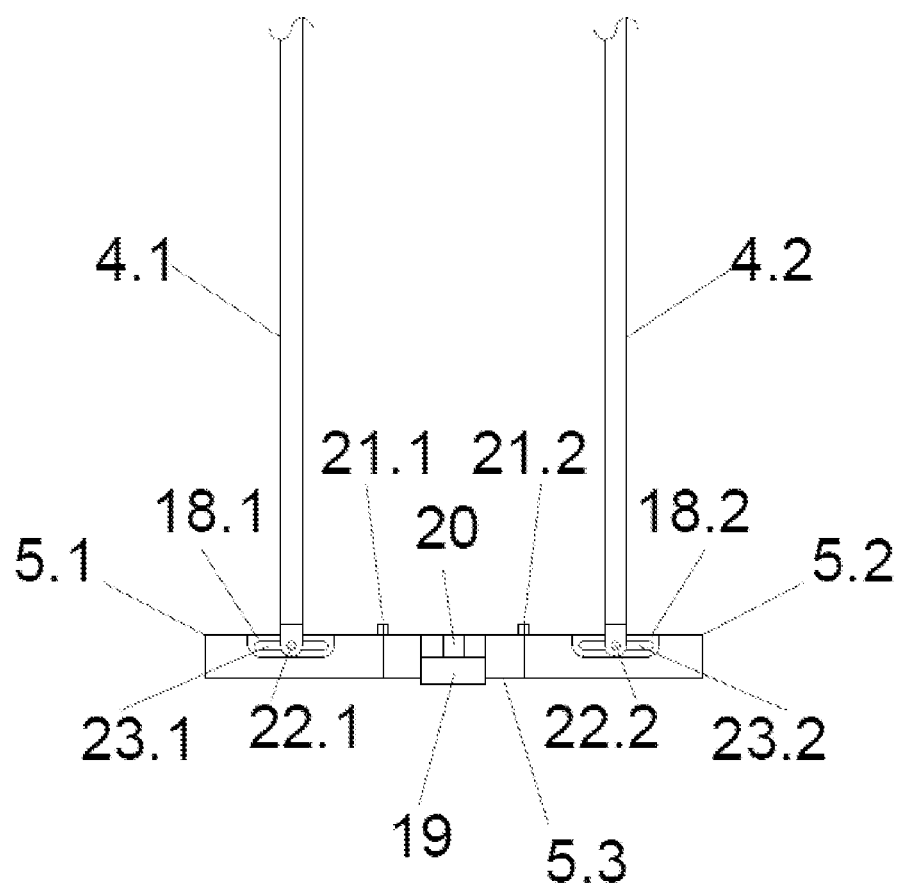
FIG. 6 is a front sectional view of the floating plate according to an embodiment of the disclosure.

FIG. 6 is a front sectional view of the floating plate of the disclosure, in which a first vertical connecting rod 4.1, a second vertical connecting rod 4.2, a first floating plate 5.1, a second floating plate 5.2, a third floating plate 5.3, a first sliding area 18.1, a second sliding area 18.2, a movable plate 19, a displacement sensor 20, a first hinge 21.1, a second hinge 21.2, a first sliding shaft 22.1, a second sliding shaft 22.2, a first sliding groove group 23.1 and a second sliding groove group 23.2 are presented.

Figure 7:
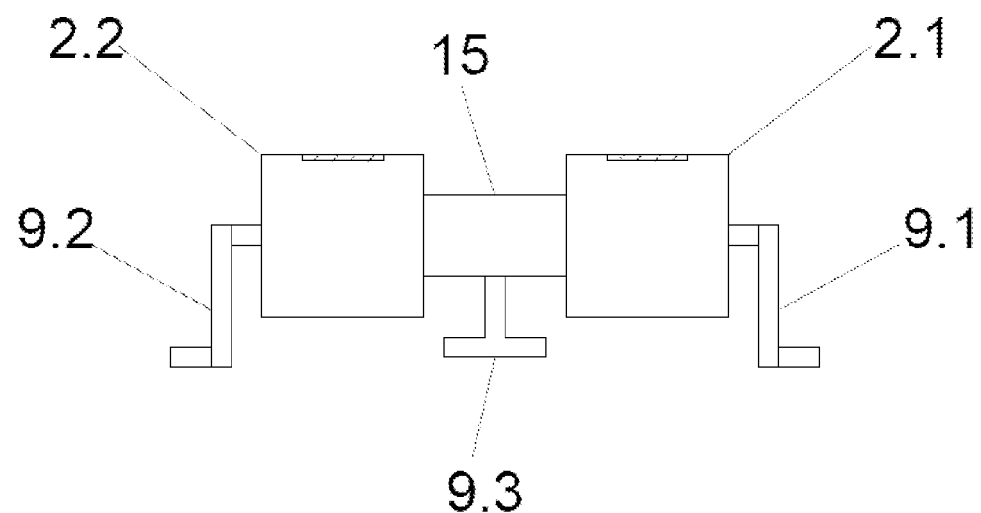
FIG. 7 is a left view of a retractable pipe according to an embodiment of the disclosure.

FIG. 7 is a left view of the retractable pipe of the disclosure, in which a first retractable pipe 2.1, a second retractable pipe 2.2, a first push-pull handle 9.1, a second push-pull handle 9.2, a third push-pull handle 9.3 and a connecting block 15 are presented.

Figure 8:
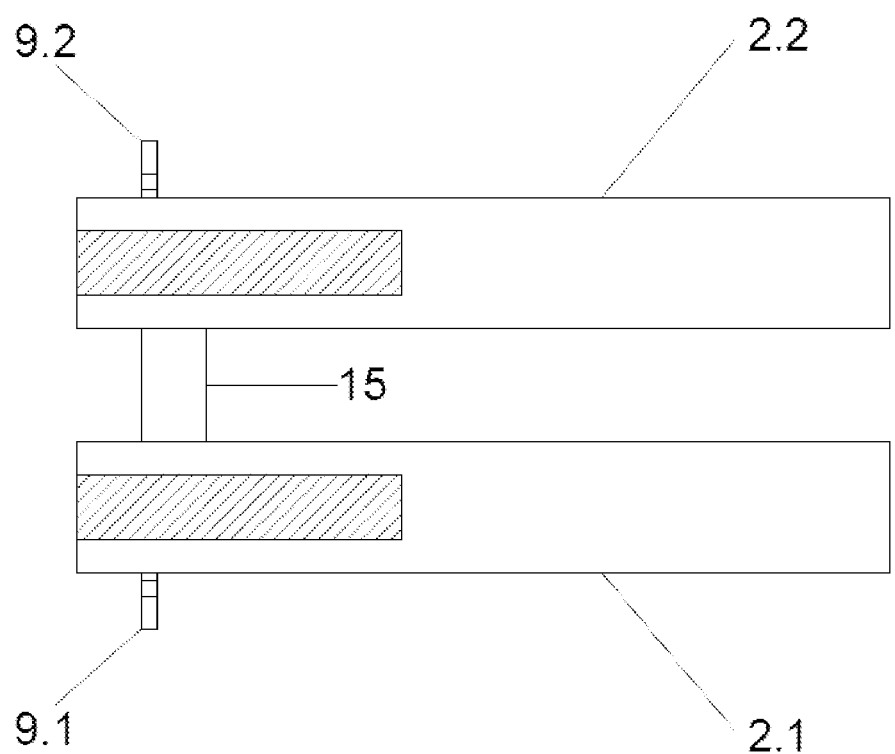
FIG. 8 is a top view of the retractable pipe according to an embodiment of the disclosure.

FIG. 8 is a top view of the retractable pipe of the disclosure, in which a first retractable pipe 2.1, a second retractable pipe 2.2, a first push-pull handle 9.1, a second push-pull handle 9.2 and a connecting block 15 are presented.

Figure 9:
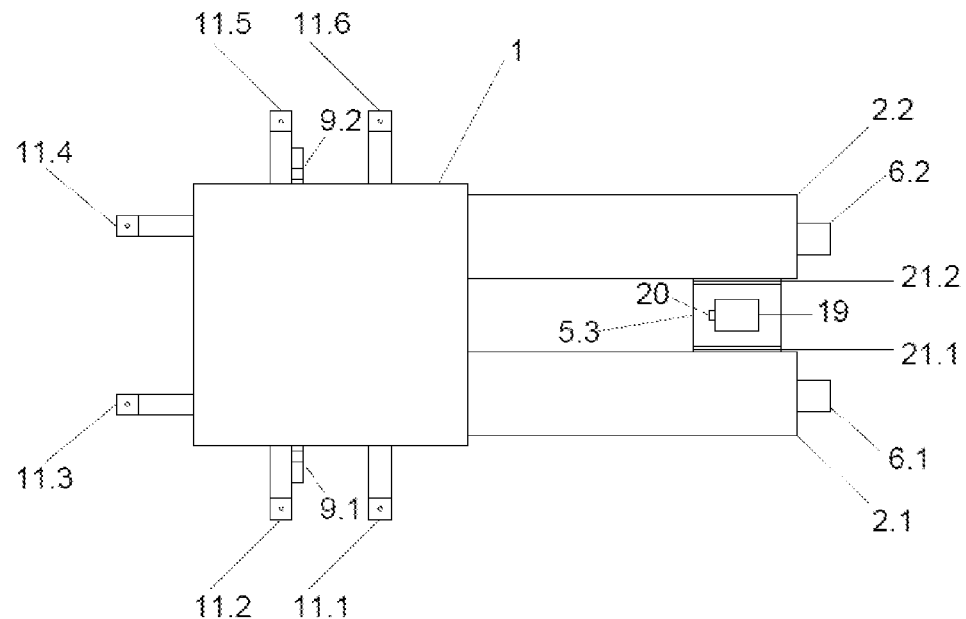
FIG. 9 is a top view of the floating plate type marine refrigerated container system capable of generating electricity by using wave energy according to an embodiment of the disclosure.

FIG. 9 is a top view of the floating plate type marine refrigerated container system capable of generating electricity by using wave energy of the disclosure, in which a machine room 1, a first retractable pipe 2.1, a second retractable pipe 2.2, a third floating plate 5.3, a first controller 6.1, a second controller 6.2, a first push-pull handle 9.1, a second push-pull handle 9.2, a first fixed support 11.1, a second fixed support 11.2, a third fixed support 11.3, a fourth fixed support 11.4, a fifth fixed support 11.5, a sixth fixed support 11.6, a movable plate 19, a displacement sensor 20, a first hinge 21.1 and a second hinge 21.2 are presented.

Figure 10:
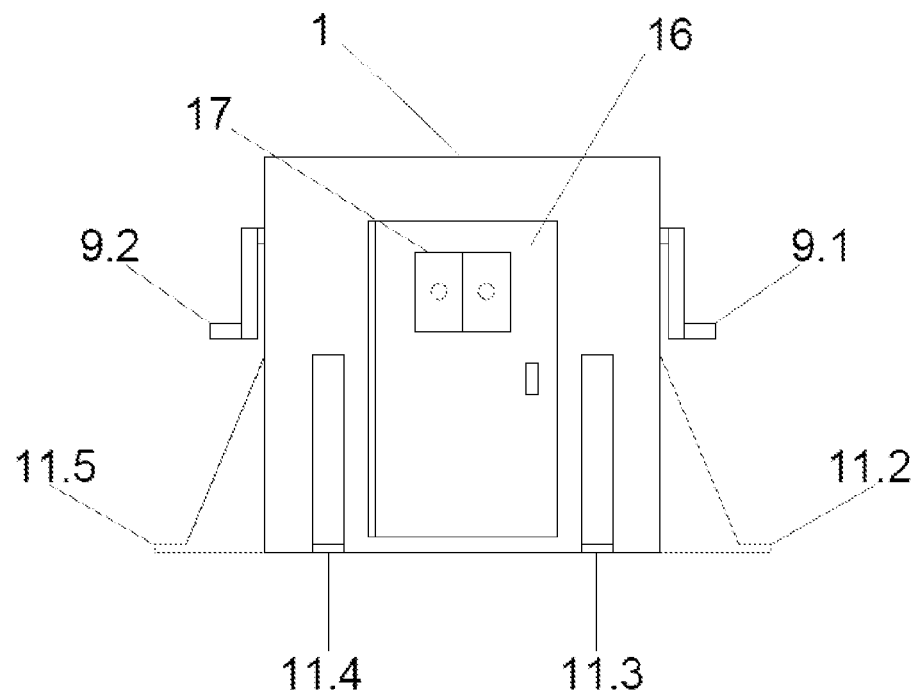
FIG. 10 is a left view of a machine room according to an embodiment of the disclosure.

FIG. 10 is a left view of the machine room 1 of the disclosure, in which a machine room 1, a first push-pull handle 9.1, a second push-pull handle 9.2, a first fixed support 11.1, a second fixed support 11.2, a third fixed support 11.3, a fourth fixed support 11.4, a fifth fixed support 11.5, a machine room door 16 and a heat dissipation window 17 are presented.

The first vertical rise-fall pipe 3.1, the second vertical rise-fall pipe 3.2, the third vertical rise-fall pipe 3.3, the fourth vertical rise-fall pipe 3.4, the fifth vertical rise-fall pipe 3.5 and the sixth vertical rise-fall pipe 3.6 constitute a first vertical rise-fall pipe group.

The seventh vertical rise-fall pipe 3.7, the eighth vertical rise-fall pipe 3.8, the ninth vertical rise-fall pipe 3.9, the tenth vertical rise-fall pipe 3.10, the eleventh vertical rise-fall pipe 3.11 and the twelfth vertical rise-fall pipe 3.12 constitute a second vertical rise-fall pipe group.

A size of a housing of the machine room 1 is 2.5×2.5×2.5 m, and the thickness of the housing is 100 mm.

The first retractable pipe 2.1 and the second retractable pipe 2.2 are arranged on the top of the right side of the machine room 1. The dimensions of the housing of the first retractable pipe 2.1 and the second retractable pipe 2.2 are both 800×800×5000 mm, and the wall thickness is 50 mm. An opening with a size of 750×750 mm is arranged at the middle of a side of the machine room 1 where the first retractable pipe 2.1 and the second retractable pipe 2.2 located, and the opening is 50 mm away from the left end surface. An opening with a cross-sectional dimension of 900×750 mm is arranged at the middle of the junction between the retractable pipe 2 and the first vertical rise-fall pipe 3.1, and the opening is 50 mm away from the right end surface. The first retractable pipe 2.1 is 100 mm away from the top side of the machine room 1, and is 100 mm away from the front side of the machine room 1. The second retractable pipe 2.2 is 100 mm away from the top side of the machine room 1, and is 100 mm away from the rear side of the machine room 1. Tops of the first retractable pipe 2.1 and the second retractable pipe 2.2 are connected to the embedded slide rail at the top of the machine room 1.

The first vertical rise-fall pipe group is arranged under the first retractable pipe 2.1. The first vertical rise-fall pipe group includes the first vertical rise-fall pipe 3.1, the second vertical rise-fall pipe 3.2, the third vertical rise-fall pipe 3.3, the fourth rise-fall pipe 3.4, the fifth vertical rise-fall pipe 3.5 and the sixth vertical rise-fall pipe 3.6 arranged from the outside to the inside. A center of a top of each of the first vertical rise-fall pipe 3.1, the second vertical rise-fall pipe 3.2, the third vertical rise-fall pipe 3.3, the fourth rise-fall pipe 3.4, the fifth vertical rise-fall pipe 3.5 and the sixth vertical rise-fall pipe 3.6 is provided with an opening with a cross-sectional size of 900×750 mm, and the thickness of the side wall of each vertical rise-fall pipe is 50 mm. Slide rails are embedded between the first vertical rise-fall pipe 3.1 and the second vertical rise-fall pipe 3.2, between the second vertical rise-fall pipe 3.2 and the third vertical rise-fall pipe 3.3, between the third vertical rise-fall pipe 3.3 and the fourth vertical rise-fall pipe 3.4, between the fourth vertical rise-fall pipe 3.4 and the fifth vertical rise-fall pipe 3.5, and between the fifth vertical rise-fall pipe 3.5 and the sixth vertical rise-fall pipe 3.6 for connection, respectively. The six vertical rise-fall pipes are all concentric tubes. With respect to first vertical rise-fall pipe 3.1, the housing has a size of 1600×800×5000 mm; the wall thickness is 50 mm; and a center of the bottom is provided with an opening with a cross-section size of 1500×700 mm. With respect to the second vertical rise-fall pipe 3.2, the housing has a size of 1500×700×5000 mm; the wall thickness is 50 mm; and a center of the bottom is provided with an opening with a cross-section size of 1400×600 mm. With respect to the third vertical rise-fall pipe 3.3, the housing has a size of 1400×600×5000 mm; the wall thickness is 50 mm; and a center of the bottom is provided with an opening with a cross-section size of 1300×500 mm. For the fourth vertical rise-fall pipe 3.4, the housing has a size of 1300×500×5000 mm; the wall thickness is 50 mm; and a center of the bottom is provided with an opening with a cross-section size of 1200×400 mm. With respect to the fifth vertical rise-fall pipeline 3.5, the housing has a size of 1200×400×5000 mm; the wall thickness is 50 mm; and a center of the bottom is provided with an opening with a cross-section size of 1100×300 mm. With respect to the sixth vertical rise-fall pipeline 3.6, the housing has a size of 1100×300×5000 mm; the wall thickness is 50 mm; and a center of the bottom is provided with an opening with a cross-section size of 1000×200 mm.

The second vertical rise-fall pipe group is arranged under the second retractable pipe 2.2. The second vertical rise-fall pipe group includes the seventh vertical rise-fall pipe 3.7, the eighth vertical rise-fall pipe 3.8, the ninth vertical rise-fall pipe 3.9, the tenth rise-fall pipe 3.10, the eleventh vertical rise-fall pipe 3.11 and the twelfth vertical rise-fall pipe 3.12 arranged from the outside to the inside. A center of the top of each of the seventh vertical rise-fall pipe 3.7, the eighth vertical rise-fall pipe 3.8, the ninth vertical rise-fall pipe 3.9, the tenth rise-fall pipe 3.10, the eleventh vertical rise-fall pipe 3.11 and the twelfth vertical rise-fall pipe 3.12 is provided with an opening with a cross-sectional size of 900×750 mm, and the thickness of the side wall of each vertical rise-fall pipe is 50 mm. Slide rails are embedded between the seventh vertical rise-fall pipe 3.7 and the eighth vertical rise-fall pipe 3.8, and between the eighth vertical rise-fall pipe 3.8 and the ninth vertical rise-fall pipe 3.9, and between the ninth vertical rise-fall pipe 3.9 and the tenth vertical rise-fall pipe 3.10, and between the tenth vertical rise-fall pipe 10 and the eleventh vertical rise-fall pipe 3.11, and between the eleventh vertical rise-fall pipe 3.11 and the twelfth vertical rise-fall pipe 3.12 for connection, respectively. The six vertical rise-fall pipes are all concentric tubes. With respect to the seventh vertical rise-fall pipe 3.7, the housing has a size of 1600×800×5000 mm; the wall thickness is 50 mm; and a center of the bottom is provided with an opening with a cross-section size of 1500×700 mm. With respect to the eighth vertical rise-fall pipe 3.8, the housing has a size of 1500×700×5000 mm; the wall thickness is 50 mm; and a center of the bottom is provided with an opening with a cross-section size of 1400×600 mm. With regard to the ninth vertical rise-fall pipe 3.9, the housing has a size of 1400×600×5000 mm; the wall thickness is 50 mm; and a center of the bottom is provided with an opening with a cross-section size of 1300×500 mm. For the tenth vertical rise-fall pipe 3.10, the housing has a size of 1300×500×5000 mm; the wall thickness is 50 mm; and a center of the bottom is provided with an opening with a cross-section size is 1200×400 mm. With respect to the eleventh vertical rise-fall pipeline 3.11, the housing has a size of 1200×400×5000 mm; the wall thickness is 50 mm; and a center of the bottom is provided with an opening with a cross-section size of 1100×300 mm. With respect to the twelfth vertical rise-fall pipeline 3.12, the housing has a size of 1100×300×5000 mm; the wall thickness is 50 mm; and a center of the bottom is provided with an opening with a cross-section size of 1000×200 mm.

The first controller 6.1 is arranged on the outer top of the first vertical rise-fall pipe 3.1, and the second controller 6.2 is arranged on the outer top of the seventh vertical rise-fall pipe 3.7;

The rising-falling control button 7 is embedded in the front of the machine room 1. The rising-falling control button 7 is 950 mm away from the bottom of the machine room 1, and is 500 mm away from the right side of the machine room 1. The size of the rising-falling control button 7 is 100×100×100 mm. The rising-falling control button 7 is remotely connected to the first controller 6.1 and the second controller 6.2.

The first generator set 12.1 is arranged in the sixth vertical rise-fall pipe 3.6, and is 500 mm away from the top of the sixth vertical rise-fall pipe 3.6. The size of the first generator set 12.1 is 1000×200×3000 mm. The second generator set 12.2 is arranged in the twelfth vertical rise-fall pipe 3.12, and is 500 mm away from the top of the twelfth vertical rise-fall pipe 3.12. The size of the second generator set 12.2 is 1000×200×3000 mm.

The first vertical connecting rod 4.1 extends from the center of the bottom of the first generator set 12.1, and the first vertical connecting rod 4.1 is connected to the first floating plate 5.1. The size of the first vertical connecting rod 4.1 between the first generator set 12.1 and the first floating plate 5.1 is 100×100×2850 mm.

The second vertical connecting rod 4.2 extends from the center of the bottom of the second generator set 12.2, and the second vertical connecting rod 4.2 is connected to the second floating plate 5.2. The size of the second vertical connecting rod 4.2 between the second generator set 12.2 and the second floating plate 5.2 is 100×100×2850 mm.

The storage battery 14 with a size of 1500×1000×1000 mm is arranged in the machine room 1. The storage battery 14 is arranged at the right corner near the front wall in the machine room 1 to leave a space for an operator to stand under the third push-pull handle to operate the third push-pull handle.

The storage battery 14 and the first generator set 12.1 are connected through the first wire 13.1, and the first wire 13.1 passes through the opening on the first retractable pipe 2.1 and the first vertical rise-fall pipe group. The storage battery 14 and the second generator set 12.2 are connected through the second wire 13.2, and the second wire 13.2 passes through the opening on the second retractable pipe 2.2 and the second vertical rise-fall pipe group.

The connecting block 15 with a size of 400×400×700 mm is arranged between the first retractable pipe 2.1 and the second retractable pipe 2.2. The connecting block 15 is 400 mm away from the left end surface of the first retractable pipe 2.1 and the second retractable pipe 2.2, and is 200 mm away from the lower end surface of the first retractable pipe 2.1 and the second retractable pipe 2.2.

The first push-pull handle 9.1 is arranged on a side of the first retractable pipe 2.1 close to the machine room 1, and is 400 mm away from the left end surface and 350 mm away from the lower end surface of the first retractable pipe 2.1.

The second push-pull handle 9.2 is arranged on a side of the second retractable pipe 2.2 close to the machine room 1, and is 400 mm away from the left end surface and 350 mm away from the lower end surface of the second retractable pipe 2.2. The third push-pull handle 9.3 is arranged in the middle under the connecting block 15.

The first groove 10.1 with a length of 1100 mm and a width of 100 mm is arranged on the front of the machine room 1, and both sides of the first groove are semicircles with a radius of 50 mm. The first groove 10.1 is 900 mm away from the left end surface of the machine room 1, and is 450 mm away from the upper end surface of the machine room 1. The second groove 10.2 with a length of 1100 mm and a width of 100 mm is arranged on the rear of the machine room 1, and both sides of the first groove are semicircles with a radius of 50 mm. The second groove 10.2 is 900 mm away from the left end surface of the machine room 1, and is 450 mm away from the upper end surface of the machine room 1.

The first fixed support 11.1, the second fixed support 11.2, the third fixed support 11.3, the fourth fixed support 11.4, the fifth fixed support 11.5 and the sixth fixed support 11.6 are all composed of a flat plate with a size of 200×700×50 mm and a triangular plate with a bottom of 500 mm, a height of 1200 mm and a thickness of 200 mm. A cylindrical hole with a diameter of 40 mm is arranged at the center of the flat plate. The bottoms of the first fixed support 11.1, the second fixed support 11.2, the third fixed support 11.3, the fourth fixed support 11.4, the five fixed support 11.5 and the sixth fixed support 11.6 are both on the same plane as the bottom of the machine room 1.

The first fixed support group includes the first fixed support 11.1 and the second fixed support 11.2, the second fixed support group includes the third fixed support 11.3 and the fourth fixed support 11.4, and the third fixed support group includes the fifth fixed support 11.5 and the sixth fixed support 11.6.

The first fixed support 11.1 and the second fixed support 11.2 are arranged on the front of the machine room 1. The first fixed support 11.1 is 700 mm away from the right side of the machine room 1, and the second fixed support 11.2 is 700 mm away from the left side of the machine room 1. The third fixed support 11.3 and the fourth fixed support 11.4 are arranged on the left side of the machine room 1. The third fixed support 11.3 is 300 mm away from the front of the machine room 1, and the fourth fixed support 11.4 is 300 mm away from the back of the machine room 1. The fifth fixed support 11.5 and the sixth fixed support 11.6 are arranged on the rear of the machine room 1. The fifth fixed support 11.5 is 700 mm away from the left side of the machine room 1, and the sixth fixed support 11.6 is 700 mm away from the right side of the machine room 1.

The machine room door 16 with a height of 2000 mm and a width of 1200 mm is arranged on the left side of the machine room 1. The machine room door 16 is 100 mm away from the bottom of the machine room 1, and is 650 mm away from the front of the machine room 1. A heat dissipation window 17 with a height of 500 mm and a width of 600 mm is arranged on the machine room door 16. The heat dissipation window 17 is 200 mm away from the top of the machine room door 16, and is 300 mm away from the right side of the machine room door 16.

The size of the first floating plate 5.1 is 800×800×200 mm. The first sliding area 18.1 is arranged at the middle of the first floating plate 5.1. The first sliding area 18.1 is 400 mm in length, 100 mm in width, and 100 mm in depth. The two sides of the bottom of the first sliding area 18.1 are quarter arc surfaces with a radius of 50 mm. The bottom of the first vertical connecting rod 4.1 is a semicircular plate with a radius of 50 mm and a thickness of 80 mm, and the first sliding shaft 22.1 with a radius of 20 mm penetrates the center of the semicircular plate. The first sliding shaft 22.1 is inserted into the first sliding groove group 23.1. The first sliding groove group 23.1 is 300 mm in length and 40 mm in width, and both sides first sliding groove group 23.1 are a semicircle with a radius of 20 mm. The first sliding groove group 23.1 is located on the middle of both sides of the first sliding area 18.1, and is 30 mm away from the top of the first floating plate 5.1.

The size of the second floating plate 5.2 is 800×800×200 mm. The second sliding area 18.2 is arranged at the middle of the second floating plate 5.2. The second sliding area 18.2 is 400 mm in length, 100 mm in width, and 100 mm in depth. The two sides of the bottom of the second sliding area 18.2 are quarter arc surfaces with a radius of 50 mm. The bottom of the second vertical connecting rod 4.2 is a semicircular plate with a radius of 50 mm and a thickness of 80 mm, and the second sliding shaft 22.2 with a radius of 20 mm penetrates the center of the semicircular plate. The second sliding shaft 22.2 is inserted into the second sliding groove group 23.2. The second sliding groove group 23.2 is 300 mm in length and 40 mm in width, and both sides of the second sliding groove group 23.2 are a semicircle with a radius of 20 mm. The second sliding groove group 23.2 is located on the middle of both sides of the second sliding area 18.2, and is 30 mm away from the top of the second floating plate 5.2.

The size of the third floating plate 5.3 is 800×650×200 mm, and the size of the movable plate 19 is 300×400×130 mm. The movable plate 19 is arranged in the third floating plate 5.3, and is 200 mm away from the front side and 150 mm from the right side of the third floating plate 5.3. Slide rails are embedded between the movable plate 19 and the third floating plate 5.3 for connection, so that the movable plate 19 can be moved freely. The initial position of the movable plate 19 is 30 mm away from the bottom of the third floating plate 5.3.

The displacement sensor 20 is arranged beside the movable plate 19, and the indicator light 8 is embedded in the front of the machine room 1. The indicator light 8 is 970 mm away from the bottom surface and 360 mm away from the right side of the machine room 1. The indicator light 8 is a circle with a radius of 30 mm. The displacement sensor 20 and indicator 8 are remotely connected.

The first floating plate 5.1 and the third floating plate 5.3 are connected by the first hinge 21.1. The first hinge 21.1 is arranged above the first floating plate 5.1 and the third floating plate 5.3. The second floating plate 5.2 and the third floating plate 5.3 are connected by the second hinge 21.2, and the second hinge 21.2 is arranged above the second floating plate 5.2 and the third floating plate 5.3.

This application mainly solves the sustainable use of energy for refrigerated containers during sea transportation, which is open-air and located on the deck of the freighter, and needs to be waterproofed.

The machine room 1, the first retractable pipe 2.1, the second retractable pipe 2.2, the first vertical rise-fall pipe 3.1, the second vertical rise-fall pipe 3.2, the third vertical rise-fall pipe 3.3, the fourth vertical rise-fall pipe 3.4, the fifth vertical rise-fall pipe 3.5, the sixth vertical rise-fall pipe 3.6, the seventh vertical rise-fall pipe 3.7, the eighth vertical rise-fall pipe 3.8, the ninth vertical rise-fall pipe 3.9, the tenth vertical rise-fall pipe 3.10, the eleventh vertical rise-fall pipe 3.11, the twelfth vertical rise-fall pipe 3.12, the first vertical connecting rod 4.1, the second vertical connecting rod 4.2, the first floating plate 5.1, the second floating plate 5.2, the third floating plate 5.3, the first push-pull handle 9.1, the second push-pull handle 9.2, the third push-pull handle 9.3, the first fixed support 11.1, the second fixed support 11.2, the third fixed support 11.3, the fourth fixed support 11.4, the fifth fixed support 11.5, the sixth fixed support 11.6, the connecting block 15, the machine room door 16, the movable plate 19, the first hinge 21.1, the second hinge 21.2, the first sliding shaft 22.1 and the second sliding shaft 22.2 are all made of aluminum alloy. The first controller 6.1, the second controller 6.2 and the displacement sensor 20 are waterproofed.

The machine room 1 should be treated with sun protection.

The first retractable pipe 2.1 and the second retractable pipe 2.2 are connected to the machine room 1 by an embedded slide rail. The extension lengths of the first retractable pipe 2.1 and the second retractable pipe 2.2 are the same. The first push-pull handle 9.1, the second push-pull handle 9.2 and the third push-pull handle 9.3 are pushed to adjust the length of the first retractable pipe 2.1 and the second retractable pipe 2.2 extending out of the machine room 1 according to the actual needs. The regulation range is 3-4.1 m.

The rising-falling control button 7 is controlled to issue instructions to the first controller 6.1 and the second controller 6.2 to control the lifting conditions of the first vertical rise-fall pipe group and the second vertical rise-fall pipe group. The lower part of the rising-falling control button 7 is pressed to issue a descending instructions, and the upper part of the rising-falling control button 7 is pressed to issue an ascending instruction. The equipment is stopped when release the rising-falling control button 7, and the operation will not exceed the limit of descending or ascending. The rising-falling control button 7 sends the same instruction to the first controller 6.1 and the second controller 6.2 at the same time. The liftable distance of each section of the first vertical rise-fall pipe 3.1, the second vertical rise-fall pipe 3.2, the third vertical rise-fall pipe 3.3, and the second controller 6.2, the four vertical rise-fall pipe 3.4, the fifth vertical rise-fall pipe 3.5 and the sixth vertical rise-fall pipe 3.6 is 4.95 m, and a total liftable distance is 29.7 m. An order from the outside to the inside is followed in the descending process, and an order from the inside to the outside is followed in the ascending process. The liftable distance of each section of the seventh vertical rise-fall pipe 3.7, the eighth vertical rise-fall pipe 3.8, the ninth vertical rise-fall pipe 3.9, the tenth vertical rise-fall pipe 3.10, the eleventh vertical rise-fall pipe 3.11 and the twelfth vertical rise-fall pipe 3.12 is 4.95 m, and a total liftable distance is 29.7 m. An order from the outside to the inside is followed in the descending process, and an order from the inside to the outside is followed in the ascending process.

Generally, the height from the deck of a freighter to the sea surface is about 25 m. After deducting the height of the machine room 1, the first floating board 5.1, the second floating board 5.2 and the third floating board 5.3 can be lowered to a maximum of 28.8 m below the deck, which conforms to the general size conditions of freighters. According to the needs of different freighters, the rising-falling control button 7 can be controlled to lower the first floating plate 5.1, the second floating plate 5.2 and the third floating plate 5.3 to a suitable height to improve the collection efficiency of the wave energy.

The lifting conditions of the first vertical rise-fall pipe group and the second vertical rise-fall pipe group are determined by the indicator light 8. When the third floating plate 5.3 is gradually in contact with the sea surface, the movable plate 19 will be pushed upward by the buoyancy of the sea. When the movable plate 19 is no longer in the initial position detected by the displacement sensor 20, the displacement sensor 20 will send a signal to the indicator light 8, and the indicator light 8 will light up. Therefore, when the indicator light 8 is light up, it proves that the first floating plate 5.1, the second floating plate 5.2 and the third floating board 5.3 have been lowered to the required height, and the rising-falling control button 7 is released to stop the lowering of the floating board.

The process of collecting wave energy is described as follows. When the waves move vertically to drive the first floating plate 5.1, the second floating plate 5.2 and the third floating plate 5.3 move up and down vertically. The first vertical connecting rod 4.1 and the second connecting rod 4.2 are respectively driven by the first floating plate 5.1 and the second floating plate 5.2 for vertical movement. The first vertical connecting rod 4.1 and the second vertical connecting rod 4.2 drive the transmissions in the first generator set 12.1 and the second generator set 12.2 to operate to convert wave energy into mechanical energy. The first generator set 12.1 and the second generator set 12.2 finally convert the mechanical energy into electrical energy. The wave energy contained in waves cannot be guaranteed to be equal everywhere at the same time, which may cause the horizontal translation of the floating plate. The horizontal translation of the first floating plate 5.1, the second floating plate 5.2 and the third floating plate 5.3 drive the first vertical connecting rod 4.1 and the second vertical connecting rod 4.2 that cannot be moved horizontally to move, so as to cause the first vertical connecting rod 4.1 and the second vertical connecting rod 4.2 to be damaged or broken by stress, which will reduce the service life. Therefore, this application provides the first sliding area 18.1 and the second sliding area 18.2 for flexible move, and the first floating plate 5.1, the second floating plate 5.2 and the third floating plate 5.3 can move horizontally without affecting the operation of the equipment, and will not drive the first vertical connecting rod 4.1 and the second vertical connecting rod to move horizontally. The first sliding shaft 22.1 and the second sliding shaft 22.2 arranged on the first vertical connecting rod 4.1 and the second vertical connecting rod 4.2 slide in the first sliding groove group 23.1 and the second sliding groove group 23.2, but the positions of the first sliding shaft 22.1 and the second sliding shaft 22.2 are fixed, and the first floating plate 5.1, the second floating plate 5.2 and the third floating plate 5.3 is movable. The first floating plate 5.1 and the third floating plate 5.3 are connected by a first hinge 21.1, and the second floating plate 5.2 and the third floating plate 5.3 are connected by a second hinge 21.2. This connection can prevent excessive horizontal movement of the first floating plate 5.1 and the second floating plate 5.2.

The length of the first wire 13.1 is 40 m, and the length of the second wire 13.2 is 43 m. The length of the first wire 13.1 and the electric wire 13.2 can ensure that the storage battery 14 can still be connected to the first generator set 12.1 and the second generator set 12.2 when the first vertical rise-fall pipe group and the second vertical rise-fall pipe group are lowered to the lowest point, and the length is long enough to ensure that the first wire 13.1 and the second wire 13.2 will not break caused by excessive tension. The first wire 13.1 and the second wire 13.2 cannot be wound and stacked. A plastic protective layer is added outside the first wire 13.1 and the second wire 13.2 to prevent wear and tear during long-term use.

The first fixed support 11.1, the second fixed support 11.2, the third fixed support 11.3, the fourth fixed support 11.4, the fifth fixed support 11.5 and the sixth fixed support 11.6 are configured to fix the machine room 1. The nails pass through the cylindrical holes of each fixed support to fix the machine room 1 on the deck of the freighter.

The heat dissipation window 17 is configured for heat dissipation, and the heat dissipation window 17 is opened when the machine room door 16 is closed to play a role of heat dissipation.

Figure 11:
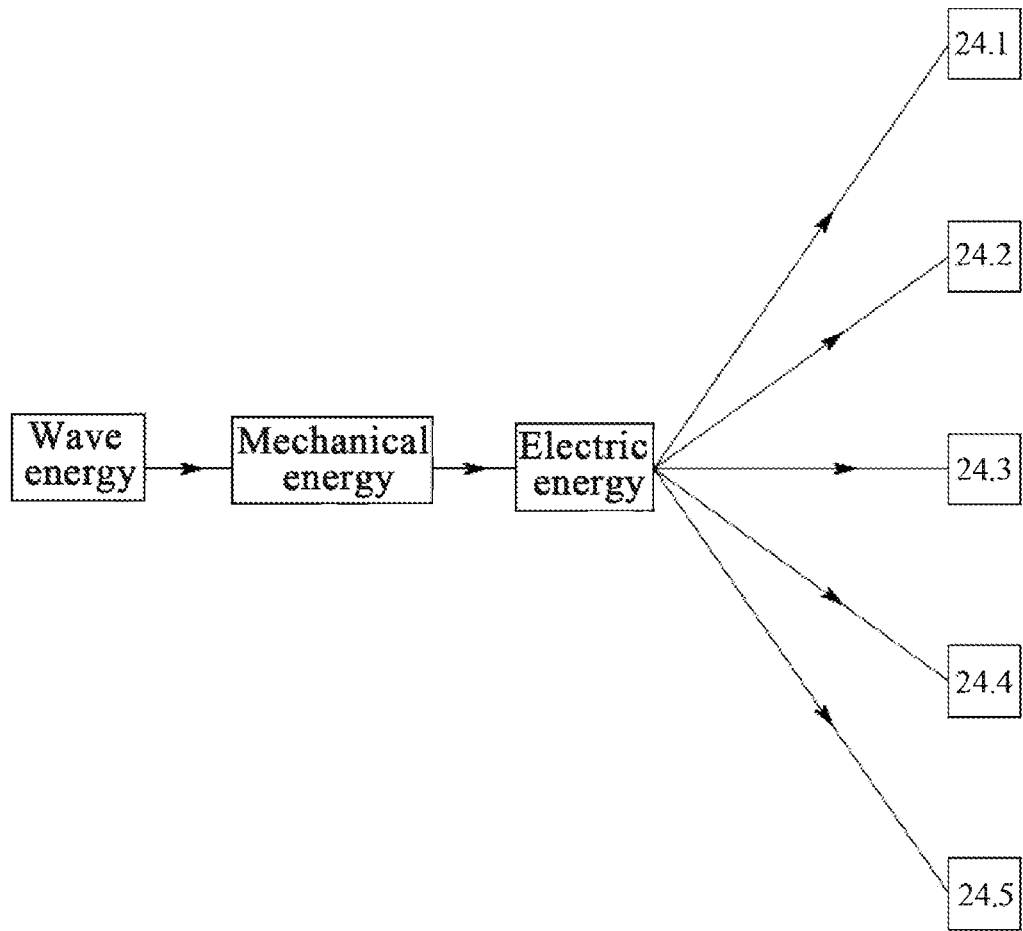
FIG. 11 is a flow chart of an energy conversion of the floating plate type marine refrigerated container system capable of generating electricity by using wave energy according to an embodiment of the disclosure.

FIG. 11 is a flow chart of a energy conversion of a floating plate type marine refrigerated container system capable of generating electricity by using wave energy of the disclosure, in which the first electrical equipment 24.1 of the refrigerated container, the second electrical equipment 24.2 of the refrigerated container, the third electrical equipment 24.3 of the refrigerated container, the fourth electrical equipment 24.4 of the refrigerated container and the fifth electrical equipment 24.5 of the refrigerated container are presented.

The use and conversion of wave energy in this application includes four stages. The first stage is to absorb the wave energy in the vertical direction using the first floating plate 5.1 and the second floating plate 5.2. The second stage is to drive the first vertical connecting rod 4.1 and the second vertical connecting rod 4.2 to move vertically through the movement of the first floating plate 5.1 and the second floating plate 5.2, so as to convert the wave energy into mechanical energy. The first vertical connecting rod 4.1 and the second vertical connecting rod 4.2 drives the transmission system in the first generator set 12.1 and the second generator set 12.2 to move to transfers the mechanical energy to the transmission system. In the third stage, the mechanical energy is converted into electric energy through the first generator set 12.1 and the second generator set 12.2, and then the electric energy is transmitted to the storage battery 14 through the first wire 13.1 and the second wire 13.2. With regard to the fourth stage, the electric energy in the storage battery pack is supplied to the first electrical equipment 24.1 of the refrigerated container, the second electrical equipment 24.2 of the refrigerated container, the third electrical equipment 24.3 of the refrigerated container, the fourth electrical equipment 24.4 of the refrigerated container and the fifth electrical equipment 24.5 of the refrigerated container.

There are two conversion paths for electric energy, which are designed in parallel. If there is a problem in one path, the conversion of wave energy into electric energy in the other path will not be affected.

In case of severe weather conditions such as storms, this application should be suspended. Storms increase the chance of equipment damage and reduce the service life. Therefore, when encountering severe weather such as storms, the refrigerated containers will be powered by the emergency power supply of the ship.

The above embodiments only exemplarily illustrate the design principles and applications of the present disclosure, and are not intended to limit the scope of the present disclosure. Any changes, equivalent modifications and improvements made by those skilled in the art without departing from the spirit of the present disclosure shall fall within the scope of the present disclosure defined by the appended claims.

What is claimed is:

1. A floating plate type marine refrigerated container system capable of generating electricity by using wave energy, comprising:
a machine room;
retractable pipes;
vertical rise-fall pipes;
vertical connecting rods;
floating plates;
controllers;
a rising-falling control button;
an indicator light;
push-pull handles;
grooves;
fixed supports;
generator sets;
wires;
a storage battery;
a connecting block;
a machine room door;
a heat dissipation window;
sliding areas;
a movable plate;
a displacement sensor;
hinges;
sliding shafts;
sliding groove groups; and
an electrical equipment of a refrigerated container;
wherein the retractable pipes comprise a first retractable pipe and a second retractable pipe;
the vertical rise-fall pipes comprise a first vertical rise-fall pipe, a second vertical rise-fall pipe, a third vertical rise-fall pipe, a fourth vertical rise-fall pipe, a fifth vertical rise-fall pipe, a sixth vertical rise-fall pipe, a seventh vertical rise-fall pipe, a eighth vertical rise-fall pipe, a ninth vertical rise-fall pipe, a tenth vertical rise-fall pipe, a eleventh vertical rise-fall pipe and a twelfth vertical rise-fall pipe;
the vertical connecting rods comprise a first vertical connecting rod and a second vertical connecting rod;
the floating plates comprise a first floating plate, a second floating plate and a third floating plate;
the controllers comprise a first controller and a second controller;
the push-pull handles comprise a first push-pull handle, a second push-pull handle and a third push-pull handle;
the grooves comprise a first groove and a second groove;
the fixed supports comprise a first fixed support, a second fixed support, a third fixed support, a fourth fixed support, a fifth fixed support and a sixth fixed support;
the generator sets comprise a first generator set and a second generator set;
the wires comprise a first wire and a second wire;
the sliding areas comprise a first sliding area and a second sliding area;
the hinges comprise a first hinge and a second hinge;
the sliding shafts comprise a first sliding shaft and a second sliding shaft;
the sliding groove groups comprise a first sliding groove group and a second sliding groove group;
the electrical equipment of the refrigerated container comprises a first electrical equipment of the refrigerated container, a second electrical equipment of the refrigerated container, a third electrical equipment of the refrigerated container, a fourth electrical equipment of the refrigerated container and a fifth electrical equipment of the refrigerated container;

the first vertical rise-fall pipe, the second vertical rise-fall pipe, the third vertical rise-fall pipe, the fourth vertical rise-fall pipe, the fifth vertical rise-fall pipe and the sixth vertical rise-fall pipe constitute a first vertical rise-fall pipe group;

the seventh vertical rise-fall pipe, the eighth vertical rise-fall pipe, the ninth vertical rise-fall pipe, the tenth vertical rise-fall pipe, the eleventh vertical rise-fall pipe and the twelfth vertical rise-fall pipe constitute a second vertical rise-fall pipe group;

the first retractable pipe and the second retractable pipe are connected to a top of a right side of the machine room;

the first vertical rise-fall pipe group is connected to an end of the first retractable pipe;

the second vertical rise-fall pipe group is connected to an end of the second retractable pipe;

the first controller is arranged on an outermost side of the first vertical rise-fall pipe group and is configured to control rising and falling of the first vertical rise-fall pipe group;

the second controller is arranged on an outermost side of the second vertical rise-fall pipe group and is configured to control rising and falling of the second vertical rise-fall pipe group;

the first generator set is arranged on an upper part of an inner side of the sixth vertical rise-fall pipe;

the second generator set is arranged on an upper part of an inner side of the twelfth vertical rise-fall pipe;

the first vertical connecting rod extends from the first generator set, and is connected to the first floating plate;

the second vertical connecting rod extends from the second generator set, and is connected to the second floating plate;

the rising-falling control button and the indicator light are arranged on one side of the machine room;

the rising-falling control button is connected to the controller for remote control;

the first push-pull handle and the second push-pull handle are arranged on the first retractable pipe and the second retractable pipe, respectively;

the first groove and the second groove are respectively arranged on two surfaces of the machine room parallel to a radial direction of the first retractable pipe and the second retractable pipe, respectively;

the first push-pull handle and the second push-pull handle pass through the first groove and the second groove, respectively;

the first fixed support, the second fixed support, the third fixed support, the fourth fixed support, the fifth fixed support, and the sixth fixed support are averagely arranged on three surfaces of the machine room without retractable pipes, the first fixed support and the second fixed support constitute a first fixed support group; the third fixed support and the fourth fixed support constitute a second fixed support group; the third fixed support group comprises the fifth fixed support and the sixth fixed support constitute a third fixed support group;

the storage battery is arranged in a corner of the machine room;

the storage battery is connected to the first generator set and the second generator set through the first wire and the second wire, respectively;

the first retractable pipe and the second retractable pipe are connected via the connecting block;

the third push-pull handle is arranged under the connecting block;

the machine room door is arranged on a surface of the machine room where the second fixed support group is arranged;

the heat dissipation window is arranged on an upper part of the machine room door;

the first sliding area is located at a center of the first floating plate;

the first sliding groove group is arranged on both sides of the first sliding area;

a lower end of the first vertical connecting rod penetrates through the first sliding shaft and is embedded in the first sliding groove group;

the second sliding area is located at a center of the second floating plate;

the second sliding groove group is arranged on both sides of the second sliding area;

a lower end of the second vertical connecting rod penetrates through the second sliding shaft and is embedded in the second sliding groove group;

the movable plate is embedded in a center of the third floating plate, and is capable of moving freely;

the displacement sensor is arranged beside the movable plate;

the indicator light is remotely connected to the displacement sensor;

the first floating plate and the third floating plate are connected via the first hinge, and the first hinge is arranged above a connection point between the first floating plate and the third floating plate;

the second floating plate and the third floating plate are connected via the second hinge, and the second hinge is arranged above a connection point between the second floating plate and the third floating plate; and the storage battery is connected to the first electrical equipment of the refrigerated container, the second electrical equipment of the refrigerated container, the third electrical equipment of the refrigerated container, the fourth electrical equipment of the refrigerated container and the fifth electrical equipment of the refrigerated container.

2. The floating plate type marine refrigerated container system of claim 1, wherein the machine room, the retractable pipes, the vertical rise-fall pipes, the vertical connecting rods, the floating plates, the push-pull handles, the fixed supports, the connecting block, the machine room door, the movable plate, the hinges and the sliding shafts are made of aluminum alloy; outer sides of the controllers and the displacement sensor are waterproofed; and sun protection treatment is performed on an outer side of the machine room.

3. The floating plate type marine refrigerated container system of claim 1, wherein the rising-falling control button is configured to simultaneously issue instructions to the first controller and the second controller, and the first controller and the second controller control the first vertical rise-fall pipe group and second vertical rise-fall pipe group, respectively; and sliding rails embedded between adjacent vertical rise-fall pipes are connected.

4. The floating plate type marine refrigerated container system of claim 1, wherein the storage battery is arranged in the machine room near a wall to leave a space for an operator to stand under the third push-pull handle to operate the third push-pull handle.

5. The floating plate type marine refrigerated container system of claim 1, wherein a plastic protective layer is provided at outer sides of the first wire and the second wire.

6. The floating plate type marine refrigerated container system of claim 1, wherein a part of the vertical connecting rod contacting the sliding area has a circular arc surface.

7. The floating plate type marine refrigerated container system of claim 1, wherein both ends of the sliding area adopt a circular arc surface, respectively, and the circular arc surface of the sliding area fits the circular arc surface of the part of the vertical connecting rod contacting the sliding area in radius.

8. The floating plate type marine refrigerated container system of claim 1, wherein the movable plate is embedded in the third floating plate and is capable of moving vertically; and an initial position of the movable plate is 20-30 mm lower than the third floating plate.

9. The floating plate type marine refrigerated container system of claim 1, wherein the displacement sensor is embedded in the third floating plate and is located beside the movable plate.

10. The floating plate type marine refrigerated container system of claim 1, wherein the storage battery is capable of powering 3-7 refrigerated containers.

* * * * *